United States Patent
Yamada (10) Patent No.: US 9,986,117 B2
(45) Date of Patent: May 29, 2018

(54) IMAGE PROCESSING DEVICE, CONTROL METHOD FOR THE SAME, AND PROGRAM

(71) Applicant: CANON KABUSHIKI KAISHA, Tokyo (JP)

(72) Inventor: Tetsuya Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 13/875,584

(22) Filed: May 2, 2013

(65) Prior Publication Data

US 2013/0301068 A1    Nov. 14, 2013

(30) Foreign Application Priority Data

May 10, 2012  (JP) .................................. 2012-108821

(51) Int. Cl.
*H04N 1/00* (2006.01)
*H04N 1/32* (2006.01)

(52) U.S. Cl.
CPC ..... *H04N 1/00856* (2013.01); *H04N 1/00925* (2013.01); *H04N 1/32358* (2013.01); *H04N 1/00408* (2013.01); *H04N 1/00474* (2013.01); *H04N 2201/0094* (2013.01); *H04N 2201/3202* (2013.01); *H04N 2201/3205* (2013.01);
(Continued)

(58) Field of Classification Search
CPC .. H06K 15/00; G06F 3/12; G06F 7/00; G06K 15/02
See application file for complete search history.

(56) References Cited

U.S. PATENT DOCUMENTS

2006/0221358 A1* 10/2006 Takahashi .......... H04N 1/00432
358/1.1
2006/0274347 A1* 12/2006 Mori .................... G06F 3/1205
358/1.13
(Continued)

FOREIGN PATENT DOCUMENTS

JP      09-284572 H    10/1997
JP      2005-053001 A   3/2005
(Continued)

OTHER PUBLICATIONS

Office Action issued in corresponding Japanese Application No. 2012-108821 dated May 10, 2016.
(Continued)

*Primary Examiner* — Frantz Bataille
(74) *Attorney, Agent, or Firm* — Carter, Deluca, Farrell & Schmidt, LLP (57) ABSTRACT

An object of the present invention is to control a Reprint function/Resend function so as not to confuse a user of an image processing device in a case where a job complete delete function is enabled. An image processing device having a reperform function to reperform an already-performed job and a delete function to delete data used in an already-performed job by overwriting the data used in the already-performed job by real data, the image processing device including a job security setting unit configured to set whether to enable the delete function, and in the case where the delete function is set to be enabled by the job security setting unit, the already-performed job is not reperformed by the reperform function.

12 Claims, 10 Drawing Sheets

(52) U.S. Cl.
CPC ........... *H04N 2201/3214* (2013.01); *H04N 2201/3215* (2013.01); *H04N 2201/3219* (2013.01); *H04N 2201/3221* (2013.01); *H04N 2201/3273* (2013.01); *H04N 2201/3274* (2013.01); *H04N 2201/3295* (2013.01)

(56) References Cited

U.S. PATENT DOCUMENTS

| | | | | |
|---|---|---|---|---|
| 2007/0201091 | A1* | 8/2007 | Tanaka | G06F 3/1204 358/1.16 |
| 2008/0005176 | A1* | 1/2008 | Shimizu | H04N 1/00244 |
| 2008/0243931 | A1* | 10/2008 | Asai | G06F 21/608 |
| 2009/0037473 | A1* | 2/2009 | Hiraguchi | H04N 1/00127 |

FOREIGN PATENT DOCUMENTS

| | | |
|---|---|---|
| JP | 2005-173640 A | 6/2005 |
| JP | 2006-094070 A | 4/2006 |
| JP | 2009-255328 A | 11/2009 |

OTHER PUBLICATIONS

Chinese Office Action issued in corresponding application No. 201310169427.X dated Apr. 10, 2015.

\* cited by examiner

| | | 400 | |
|---|---|---|---|
| JOB HISTORY 401 | 402 | | |

| PRINTING | SENDING | 403 |
|---|---|---|

| DATE | JOB NAME | USER NAME | RESULT |
|---|---|---|---|
| 09/01 14:32 | INVOICE.doc | yamada | OK |
| 09/01 15:00 | REPORT.doc | yamada | NG |
| 09/01 15:22 | SETTLEMENT.doc | mizuno | OK |

REPERFORM  CLOSE
404       405

FIG.4

| SECURITY SETTING |
|---|
| JOB DATA DELETE SETTING <br> ☐ COMPLETELY DELETE IMMEDIATELY <br>       AFTER PERMORMING JOB <br> 501 |

IMAGE PROCESSING DEVICE, CONTROL METHOD FOR THE SAME, AND PROGRAM

BACKGROUND OF THE INVENTION

Field of the Invention

The present invention relates to a control method for an image processing device having a function to reperform a job and a function to completely delete job data.

Description of the Related Art

In recent years, there is an MFP (Multi Function Peripheral) having a Reprint/Resend function capable of reperforming printing and sending at any timing by saving image data after performing a job, such as printing, sending, etc.

On the other hand, accompanying a rise in awareness of security in recent years, there is also an MFP having a function to completely delete image data by deleting management information immediately after the job is performed and further by overwriting the data by real data in order to prevent the image data remaining in an HDD etc. after the job is performed from being intercepted etc. by another (see Japanese Patent Laid-Open No. H09-284572 (1997)).

It is hardly possible for a user (for example, an administrator etc. of an MFP) who desires to make use of the function to completely delete the above-described job to simultaneously intend to make use of the function to reperform the job by saving the image data after the job is performed. That is, the function to reperform a job and the function to completely delete a job are in an incompatible relationship.

SUMMARY OF THE INVENTION

An image processing device according to the present invention is an image processing device having a reperform function to reperform an already-performed job and a delete function to delete data used in an already-performed job by overwriting the data used in the already-performed job by real data, the image processing device including a job security setting unit configured to set whether to enable the delete function, and in the case where the delete function is set to be enabled by the job security setting unit, the already-performed job is not reperformed by the reperform function.

According to the present invention, it is possible for a user to make use of the job reperform function and the job complete delete function in an incompatible relationship without confusion.

Further features of the present invention will become apparent from the following description of exemplary embodiments (with reference to the attached drawings).

DESCRIPTION OF THE EMBODIMENTS

Hereinafter, embodiments of the present invention are explained in detail with reference to the drawings.

First Embodiment (System Configuration)

Figure 1:
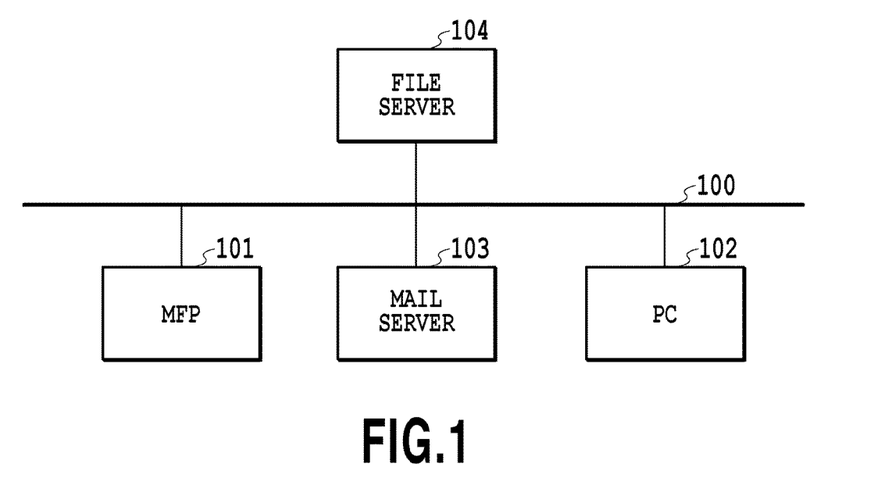
FIG. 1 is a diagram showing a system configuration example including an MFP as an image processing device according to a first embodiment.

FIG. 1 is a diagram showing a system configuration example including an MFP 101 as an image processing device according to a first embodiment. The system shown in FIG. 1 includes the MFP 101, a PC 102, a mail server 103, and a file server 104, and those components are connected to one another via a LAN 100.

The MFP 101 is an image processing device, a so-called multi-function peripheral, having various kinds of functions of, such as copying, printing, a scanner, a mail, a FAX, and BOX storage.

The PC 102 is a computer configured to create a job to instruct to perform printing (print job) etc. and send the job etc. to the MFP 101.

The mail server 103 is a server made use of at the time of sending of a mail from the MFP 101.

The file server 104 is a server made use of as a sending destination of a document from the MFP 101.

Figure 2:
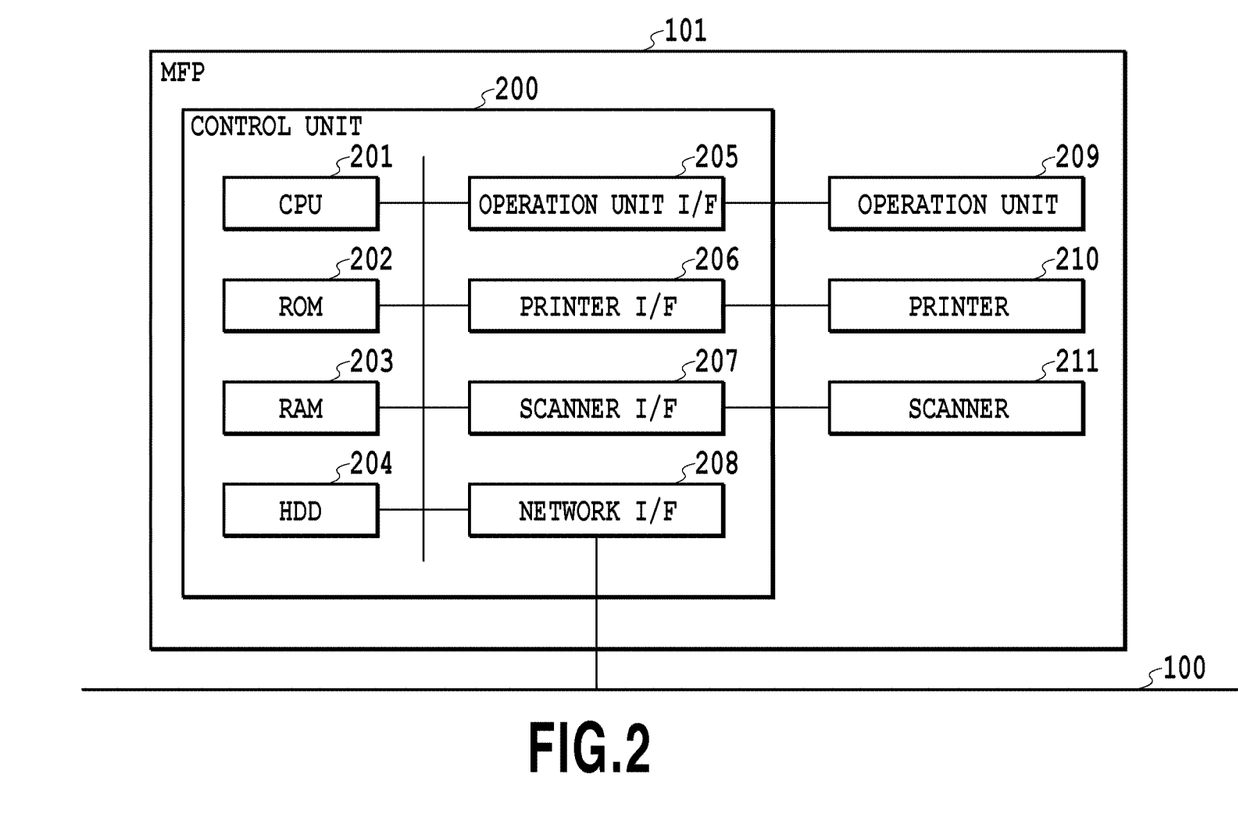
FIG. 2 is a block diagram showing an internal configuration of the MFP.

FIG. 2 is a block diagram showing an internal configuration of the MFP 101.

A control unit 200 including a CPU 201 etc. controls the operation of the MFP 101 on the whole.

The CPU 201 reads a control program stored in a ROM 202 and performs various kinds of controls, such as read control and sending control. A RAM 203 is used as a temporary storage region, such as a main memory and a work area, of the CPU 201.

An HDD 204 stores image data, various kinds of programs, and various kinds of setting contents, to be described later. Further, the HDD 204 stores job data (image data used in execution of a job, temporary data etc.) used at the time of execution of the job by the MFP 101.

An operation unit I/F 205 is an interface between an operation unit 209 and the control unit 200. The operation unit 209 by which a user gives various kinds of instructions includes a liquid crystal display etc. provided with a touch panel and functions also as a display unit to display various kinds of information.

A printer I/F 206 is an interface between a printer 210 and the control unit 200. Image data to be printed according to a print job is transferred from the control unit 200 via the printer I/F 206 and printed on a recording medium, such as paper, in the printer 210.

A scanner I/F 207 is an interface between a scanner 211 and the control unit 200. The scanner 211 reads a document set on a document table etc., not shown schematically, and generates image data. The generated image data is input to the control unit 200 via the scanner I/F 207.

A network I/F 208 is an interface between the control unit 200 (MFP 101) and a network, such as the LAN 100. The network I/F 208 sends image data and information to an external device (for example, PC 102) connected via the LAN 100 and receives various kinds of information from the external device.

(Software Configuration)

Figure 3:
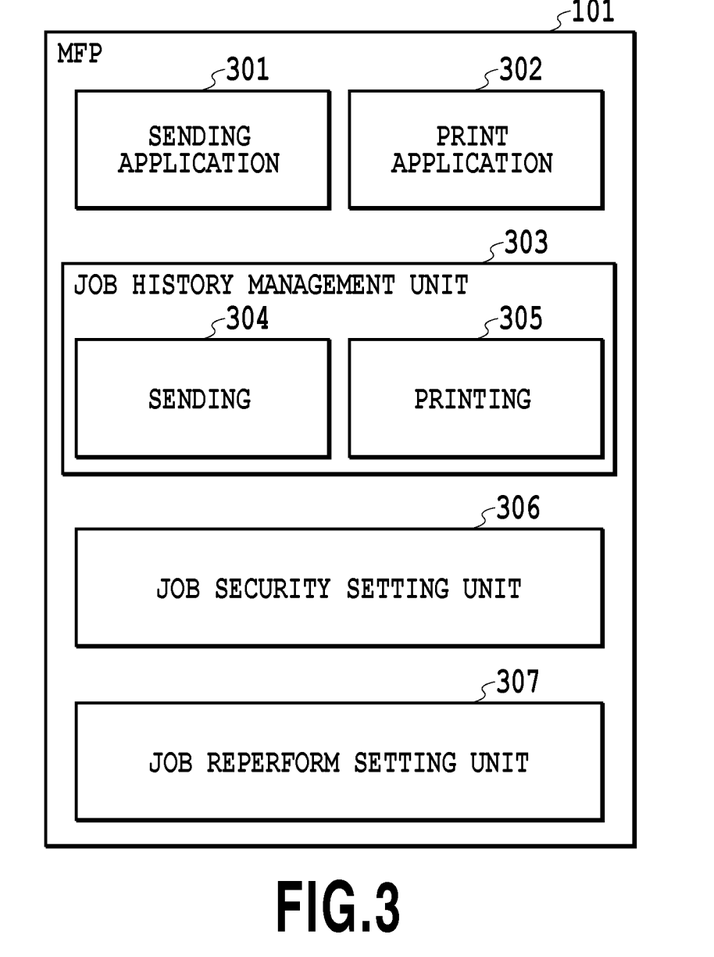
FIG. 3 is a block diagram showing a software configuration of the MFP according to the first embodiment.

FIG. 3 is a block diagram showing a software configuration of the MFP 101 according to the present embodiment.

A sending application 301 is an application configured to send various kinds of data to an outside destination based on a job to instruct to perform sending (sending job). For example, the sending application 301 sends image data generated by the scanner 211 as a mail via the mail server 103 or sends the image data to the file server 104. Job data used in the sending job performed by the sending application 301 is subjected to processing after being temporarily stored in the HDD 204 and saved in a predetermined storage region within the HDD 204 also after the sending job is performed in accordance with a reperform setting, to be described later. The sending application 301 also includes the function (Resend function) to reperform the sending job based on the job data saved in the manner described above. Besides the above, the sending application 301 also provides a screen to cause a user to set a format or a sending destination of image data obtained by a scan. It is possible for the Resend function also to send job data used by a print application 302, to be described later, to the outside destination.

A print application 302 is an application configured to output image data to a recording medium, such as paper, in the printer 210 based on, for example, data (PDL data etc.) of a print job sent from the PC 102. The job data of the print job performed by the print application 302 is subjected to processing after being temporarily stored in the HDD 204 and saved in the HDD 204 also after the print job is performed in accordance with a reperform setting, to be described later. The print application 302 also includes a function (Reprint function) to reperform the print job saved in the manner described above. It is possible for the Reprint function also to perform printing based on the job data used by the sending application 301.

Figure 4:
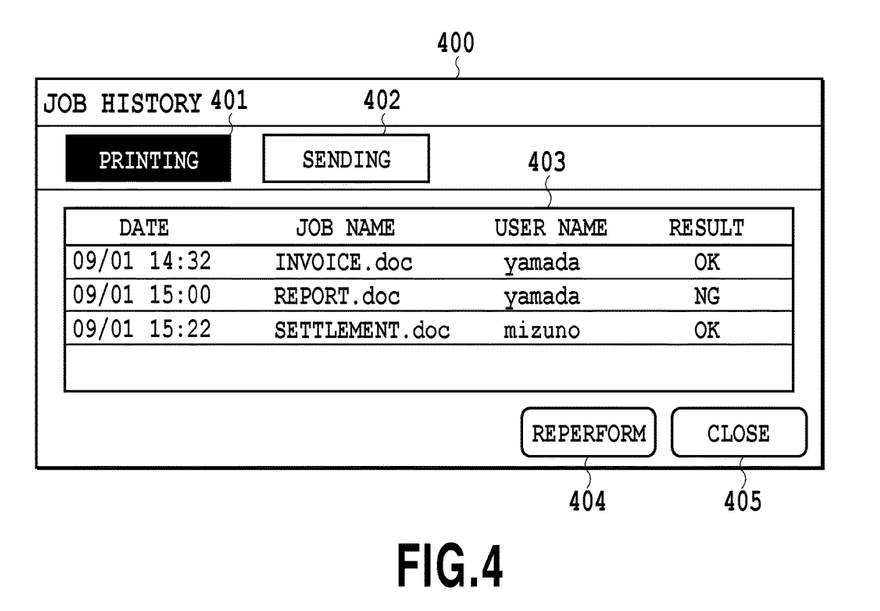
FIG. 4 is a diagram showing an example of a job history screen.

A job history management unit 303 manages already-performed jobs stored in the HDD 204. Specifically, the job history management unit 303 manages update of job history information (information of already-performed jobs is arranged, for example, chronologically for each application), read of job data in response to instructions for reperform from a user, etc. In response to the instructions for reperform via the job history screen displayed on the operation unit 209, job data of the job is read from the HDD 204 and performed by a corresponding predetermined application. FIG. 4 is a diagram showing an example of a job history screen for a user to check the history of a job and to instruct to reperform a predetermined already-performed job. Buttons 401 and 402 in a job history screen 400 are buttons to select one of the applications whose job is caused to be displayed. The history information of a job (date of performance of the job, name of the job, user name who has performed the job, performance result of the job, etc.) in the application corresponding to the button pressed down is displayed chronologically in a list within a job history display region 403. FIG. 4 shows a state where the button 401 is selected and the word "print" is inverted and displayed in white. A button 404 is a reperform button and in the case where the button 404 is pressed down after one of jobs is selected from those displayed in a list within the job history display region 403, reperform of the selected job is started. However, in the case where "disabled" is set in a reperform setting screen, to be described later, the reperform button 404 is not displayed. That is, the job reperform function is restricted. Details will be described later. A button 405 is the button to press down in the case where it is intended to exit the display of the job history screen.

Figure 5:
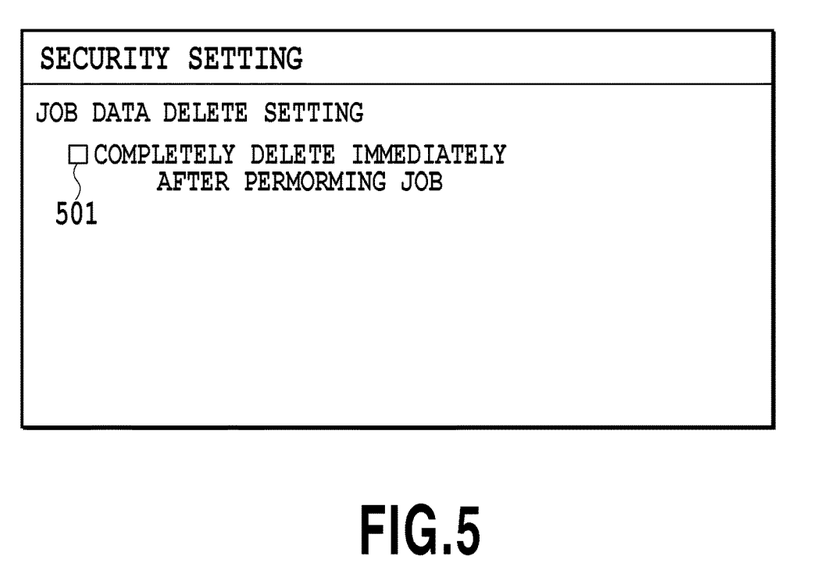
FIG. 5 is a diagram showing an example of a security setting screen.

A job security setting unit 306 manages job data to be stored in the HDD 204 at the time of processing of the job. Specifically, the job security setting unit 306 performs processing relating to the setting whether to completely delete the job data from the HDD 204 after the job is performed, for example, processing to display a screen (security setting screen) on which for a user to perform the setting on the operation unit 209, etc. FIG. 5 is a diagram showing an example of the security setting screen. A user who intends to completely delete data of an already-performed job checks a check box 501 in the security setting screen displayed on the operation unit 209. In the case where the check box 501 is checked, the job data complete delete function is set to be enabled and contents of the setting are saved in the HDD 204 etc. In the case where the job data complete delete function is set to be enabled, after a job is performed, job data used in the job is overwritten once or a plurality of times by real data, such as random data. Due to this, the job data is deleted physically from the HDD 204.

Further, in the case where the job data complete delete function is set to be enabled in the manner described above, the job security setting unit 306 performs processing to completely delete job data of an already-performed job from the HDD 204 (processing to make it impossible to reperform the already-performed job). For example, at a timing of the change in the contents of setting from disabled to enabled, the job security setting unit 306 checks whether data of the already-performed job is saved in the HDD 204 and in the case where the data is saved, the job security setting unit 360 completely deletes the job data saved at that point of time. Here, a job used in the present embodiment is explained using a print job as an example. Job data of a print job includes management information and image data. Then, the management information includes information indicative of the version of a job, page information of a document, information for specifying a format at the time of printing, etc. Image data includes PDL data described in PDL etc. It may also be possible to use raster data obtained by developing PDL data as image data in place of PDL data. Then, at the time of complete deletion, job data is completely deleted from the HDD 204 by overwriting the real data part (image data) of the job data by null data or random data, in addition to deletion of the management information.

Figure 6:
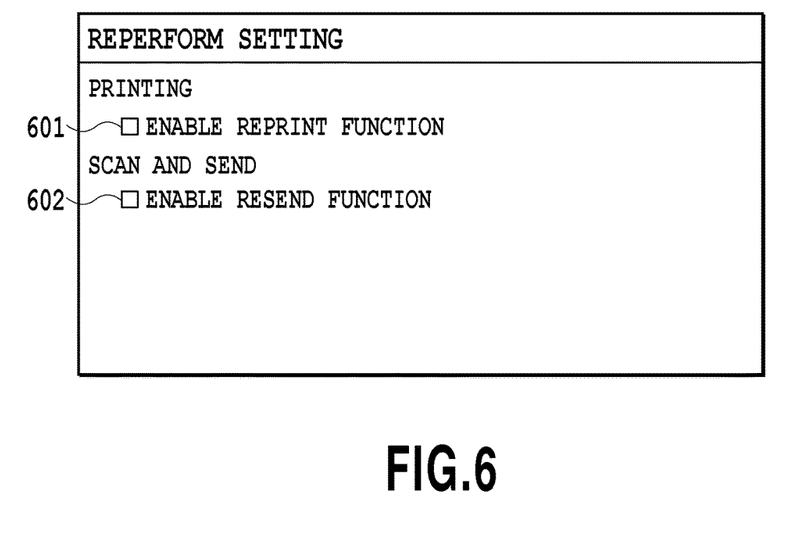
FIG. 6 is a diagram showing an example of a reperform setting screen.

A job reperform setting unit 307 manages enabling/disabling of the Resend function in the sending application 301 and the Reprint function in the print application 302, described above. Specifically, the job reperform setting unit 701 performs processing relating to the setting of whether the Resend function or the Reprint function is enabled, for example, processing to display a screen (reperform setting screen) for a user to perform the setting on the operation unit 209, etc. FIG. 6 is a diagram showing an example of a reperform setting screen. For example, a user who intends to use the Reprint function checks a checkbox 601 of "Enable Reprint function" in the reperform setting screen displayed on the operation unit 209. Similarly, a user who intends to use the Resend function checks a checkbox 602 of "Enable Resend function". In accordance with the checkmarks input in the checkboxes 601/602, the Reprint function/Resend function is set to be enabled and contents of the setting are saved in the HDD 204 etc. After the Reprint function/Resend function is set to be enabled, the function is displayed in a state where it can be used, specifically, in the state where the reperform button 404 can be pressed down in the job history screen (see FIG. 4) described above.

Figure 7:
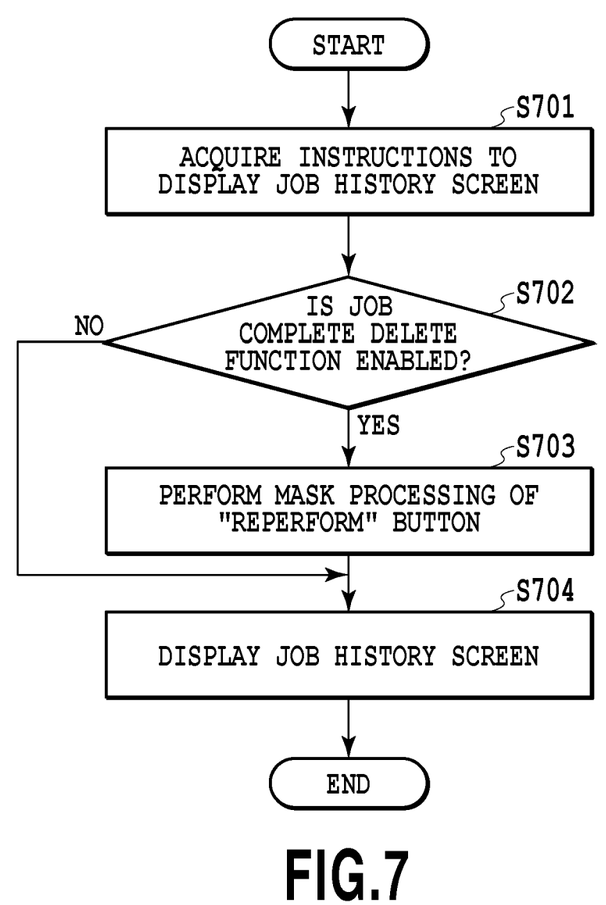
FIG. 7 is a flowchart showing a flow of control processing of the MFP according to the first embodiment.

FIG. 7 is a flowchart according to the present embodiment showing a flow of control processing to enable a user to make use of the job data complete delete function and the job reperform function without confusion. The series of pieces of processing is performed by the CPU 201 executing a computer executable program in which a procedure to be shown below is described after reading the program from the ROM 202 and writing the program to the RAM 203.

At step 701, the CPU 201 acquires user's instructions to display the job history screen. The user's instructions are given, for example, via a main menu screen, not shown schematically, displayed on the operation unit 209.

At step 702, the CPU 201 determines whether the job data complete delete function is set to be enabled by referring to the save region of the security setting contents of the HDD 204 etc. In the case where the job data complete delete function is set to be enabled, the procedure proceeds to step 703. On the other hand, in the case where the job data complete delete function is set to be disabled, the procedure proceeds to step 704.

At step 703, the job security setting unit 306 produces a job history screen in which the reperform button 404 has been subjected to mask processing. Due to this, it is no longer possible to press down the reperform button 404 and a user cannot give instructions for reperform. Mask processing is merely an example and what is required is to produce a job history screen on which a user cannot give instructions for reperform.

At step 704, the CPU 201 displays the job history screen on the operation unit 209. At this time, in the case where it is determined that the job data complete delete function is set to be disabled at step 702, the normal job history screen in which the reperform button 404 is not subjected to mask processing is displayed. On the other hand, in the case where it is determined that the job data complete delete function is set to be enabled at step 702, the job history screen in which the reperform button 404 cannot be pressed down produced at step 703 is displayed.

As described above, according to the present embodiment, control is performed so that an already-performed job cannot be reperformed as long as the job data complete delete function is set to be enabled, and therefore, it is possible for a user to make use of the job reperform function and the job complete delete function without confusion.

Second Embodiment

Next, an aspect is explained as a second embodiment, in which in the case where the job data complete delete function is set to be enabled, the job reperform setting itself is further disabled. Explanation of parts common to those in the first embodiment is simplified or omitted and here, different points are explained mainly.

Figure 8:
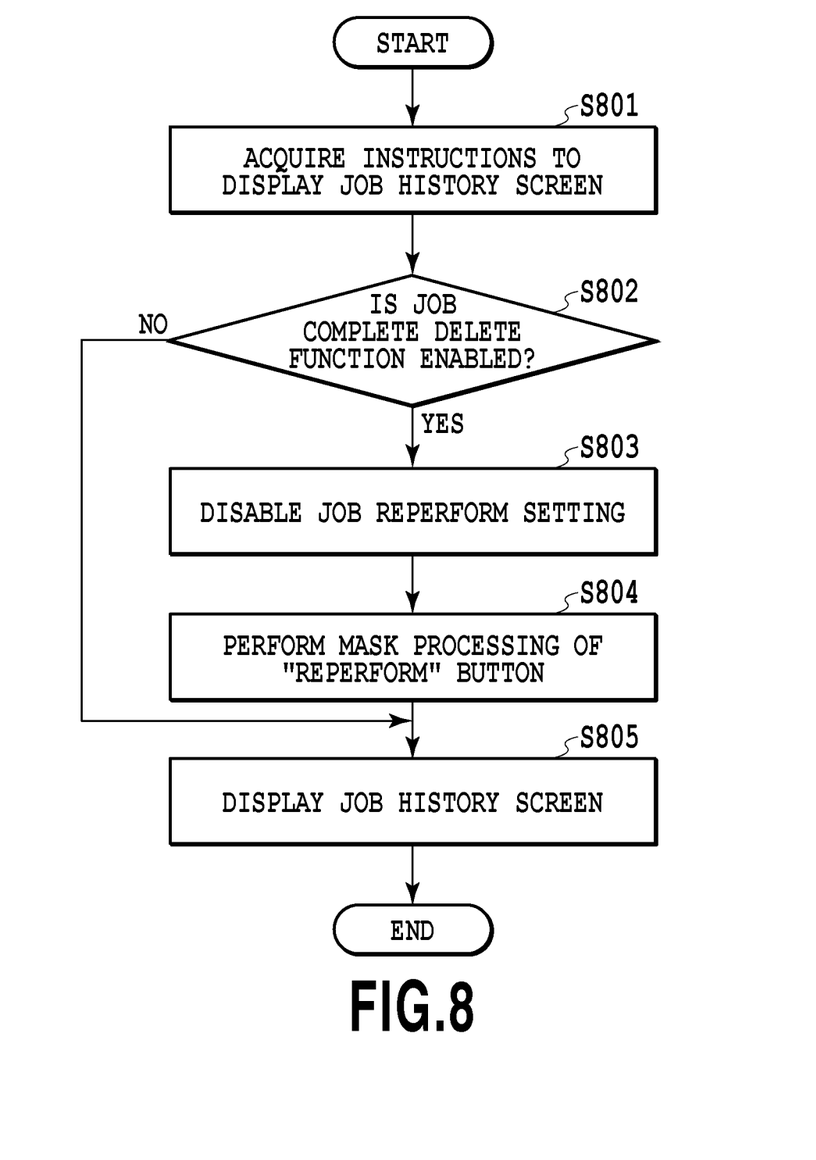
FIG. 8 is a flowchart showing a flow of control processing of an MFP according to a second embodiment.

FIG. 8 is a flowchart according to the present embodiment showing a flow of control processing to enable a user to make use of the job data complete delete function and the job reperform function without confusion. The series of pieces of processing is performed by the CPU 201 executing a computer executable program in which a procedure to be shown below is described after reading the program from the ROM 202 and writing the program to the RAM 203.

At step 801, the CPU 201 acquires user's instructions to display the job history screen.

At step 802, the CPU 201 determines whether the job data complete delete function is set to be enabled by referring to the saved security setting contents. In the case where the job data complete delete function is set to be enabled, the procedure proceeds to step 803. On the other hand, in the case where the job data complete delete function is set to be disabled, the procedure proceeds to step 805.

At step 803, the CPU 201 disables the job reperform setting. Specifically, first, the setting contents in which the job reperform setting is currently set "enabled" are changed to those in which the setting is set "disabled". Further, for example, the CPU 201 causes each setting item to be displayed in the grayed out state or prevents the reperform setting screen itself from being displayed so that the Reprint/Resend function cannot be set to be enabled afterward via the reperform setting screen (see FIG. 6) described previously.

At step 804, the job security setting unit 306 produces the job history screen in which the reperform button 404 has been subjected to mask processing.

At step 805, the CPU 201 displays the job history screen on the operation unit 209. As at step 704 according to the first embodiment, in accordance with the result of determination at step 802, the normal job history screen or the job history screen in which the reperform button 404 has been subjected to mask processing is displayed.

As described above, according to the present embodiment, while the job data complete delete function is set to be enabled, the setting to reperform a job is disabled, and therefore, it is possible for a user to more securely make use of the job reperform function and the job complete delete function without confusion.

In the flowchart in FIG. 8, also in the case where the setting of the job data complete delete function is changed from disabled to enabled without performing step 801, it may also be possible to cause the procedure to proceed to step 803 to disable the job reperform setting. In such a case, the flowchart in FIG. 8 is exited without performing step 804 and step 805.

Third Embodiment

Next, an aspect is explained as a third embodiment, in which whether or not a user intends to reperform a job is checked in the case where the job data complete delete function is set to be disabled. Explanation of parts common to those of the first embodiment is simplified or omitted and here, different points are explained mainly.

Figure 9:
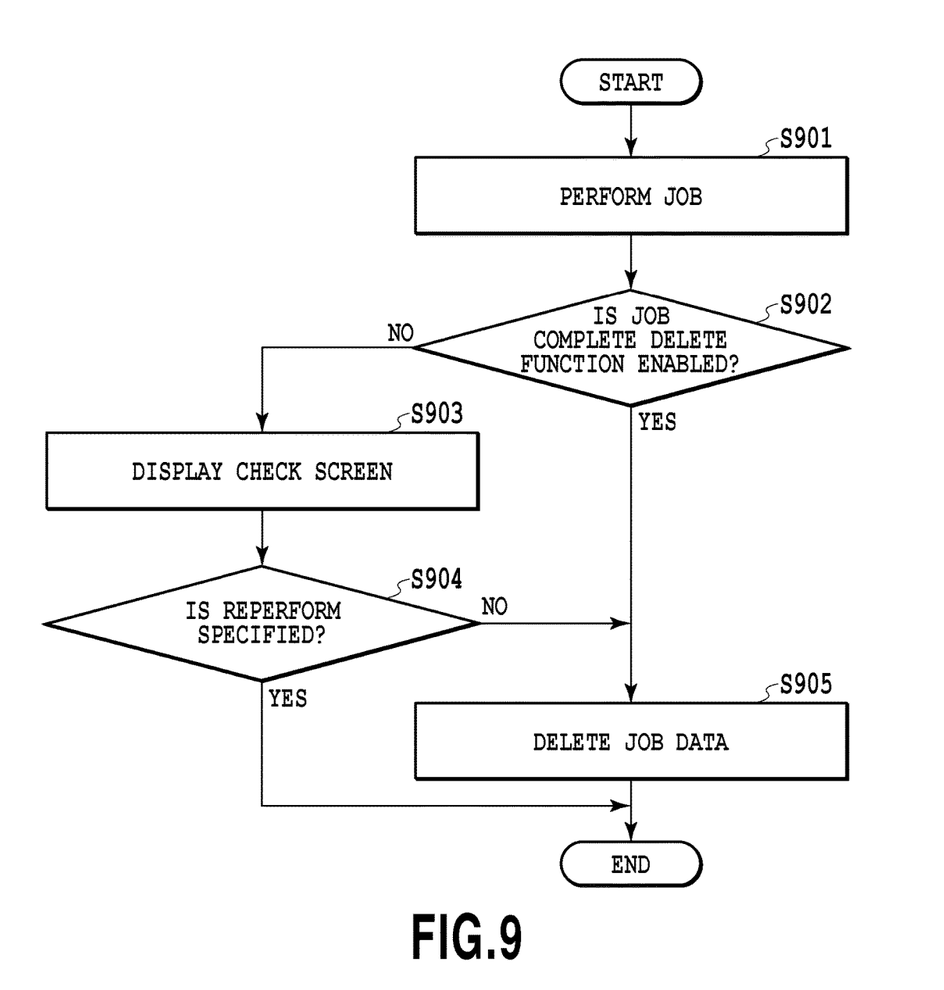
FIG. 9 is a flowchart showing a flow of control processing of an MFP according to a third embodiment.

FIG. 9 is a flowchart according to the present invention showing a flow of control processing to enable a user to make use of the job data complete delete function and the job reperform function without confusion. The series of pieces of processing is performed by the CPU 201 executing a computer executable program in which a procedure to be shown below is described after reading the program from the ROM 202 and writing the program to the RAM 203.

At step 901, the CPU 201 performs a job relating to user's instructions. Here, each of the following steps is explained on the assumption that a sending job is performed by the sending application 301. As explained in the first embodiment, a job is performed after being saved temporarily in the HDD 204, and in the case where the reperform setting is set to be enabled, the job data remains saved after the job is performed.

At step 902, the CPU 201 determines whether the job data complete delete function is set to be enabled by referring to the saved security setting contents. In the case where the job data complete delete function is set to be enabled, the procedure proceeds to step 905. On the other hand, in the case where the job data complete delete function is set to be disabled, the procedure proceeds to step 903.

Figure 10:
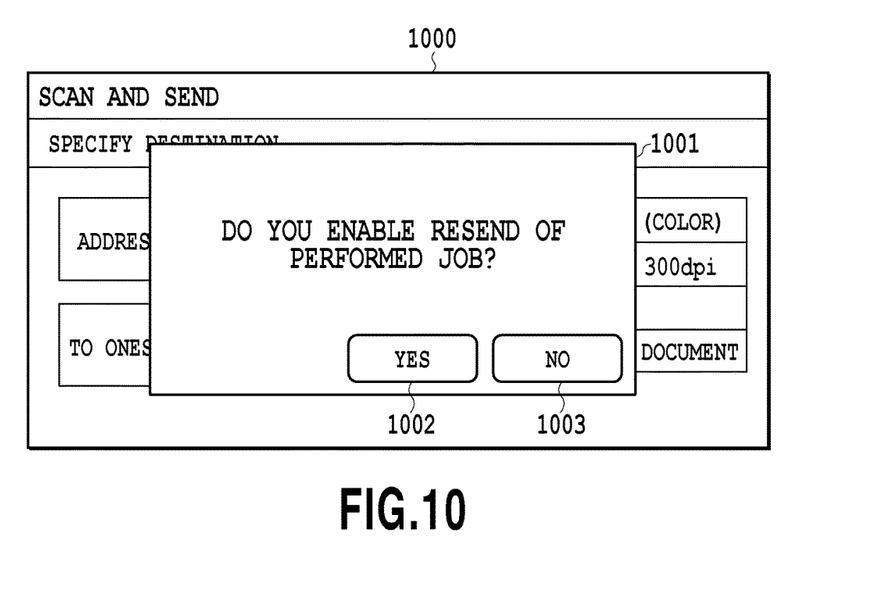
FIG. 10 is a diagram showing an example of a check display.

At step 903, the CPU 201 produces a display to check whether a user intends to make it possible to reperform a job that is performed (here, whether a user intends to enable Resend). FIG. 10 is a diagram showing an example of a check display in the case where the sending application is activated. In the state where a sending application screen 1000 displayed on the operation unit 209 is displayed, a popup screen 1001 to check whether a user intends to save the job data of the sending job that is performed for Resend is displayed. In the case where a user intends to make it possible to reperform the job, the user presses down a "Yes" button 1002 or in the case where not, the user presses down a "No" button 1003 to specify to save or not to save the job (here, the sending job). In this manner, in the present embodiment, in the case where the job reperform setting is set "disabled", a user's intention is involved in determination of whether to save data of the already-performed job for reperform.

At step 904, the CPU 201 determines whether instructions to make it possible to reperform a job that is performed are given. In the case where the instructions to enable reperform are not given, the procedure proceeds to step 905. On the other hand, in the case where the instructions to enable reperform are given, this processing is exited. That is, data of the job that is performed is saved in the HDD 204 for reperform as a result.

At step 905, the job security setting unit 306 completely deletes job data of the job performed at step 901 from the HDD 204.

As described above, according to the present embodiment, it is possible to appropriately specify a job, for which a user intends to make use of the reperform function, after performing the job, and therefore, it is possible for the user to make use of the job reperform function and the job complete delete function without confusion and in accordance with circumstances.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-108821, filed May 10, 2012, which is hereby incorporated by reference herein in their entirety.

What is claimed is:

1. An image processing device comprising:
   a display configured to display a print job history screen which represents a list of a plurality of already-printed print jobs;
   at least one processor; and
   at least one memory coupled to the at least one processor, the at least one memory having stored thereon data used in execution of a print job and instructions, which when executed by the at least one processor, cause the image processing device to:
   selectively set a reprint function included in the image processing device to be enabled or disabled according to user operation on a reprint setting screen to be displayed by the display, wherein the setting via the reprint setting screen applies not only to a specific print job to be printed but also to the list of the plurality of already-printed print jobs represented on the print job history screen displayed by the display;
   in a case where the reprint function is set to be enabled, reprint an already-printed print job using the data stored in the at least one memory, wherein the already-printed print job is selected from the list of the plurality of already-printed print jobs represented on the print job history screen displayed by the display,
   selectively set a delete function included in the image processing device to be enabled or disabled according to user operation on a job security setting screen to be displayed by the display, wherein the setting via the job security setting screen applies not only to a specific print job to be printed but also to a plurality of print jobs executed by the image processing apparatus;
   delete, after execution of a print job is completed, data used in executing the print job from the at least one memory by overwriting the data by other data in a case where the delete function is set to be enabled,
   set the reprinting function to be disabled in response to setting of the delete function to be enabled, and
   restrict the display to not accept an instruction to reprint any one of the already-printed print jobs included in the displayed print job history screen in a case where the delete function is set to be enabled,
   wherein, in a case where the delete function is set to be disabled, the display displays on the print job history screen a reprint button for accepting the instruction to reprint at least one of the already-printed print jobs, and
   wherein, in a case where the delete function is set to be enabled, the display does not display the reprint button on the print job history screen.

2. The image processing device according to claim 1, wherein, in a case where the reprinting function is enabled, data used in the already-printed print job is stored in a predetermined region of the at least one memory.

3. The image processing device according to claim 1, wherein, in a case where the delete function is set to be enabled, a status display is produced to check whether to enable reprint of a job after the print job is performed.

4. A control method for an image processing device comprising: displaying a print job history screen which represents a list of a plurality of already printed print jobs;
   storing data used in execution of a print job;
   selectively setting a reprint function included in the image processing device to be enabled or disabled according to user operation on a reprint setting screen to be displayed by the display, wherein the setting via the reprint setting screen applies not only to a specific print job to be printed but also to the list of the plurality of already-printed print jobs represented on the print job history screen displayed by the display;
   in a case where the reprint function is set to be enabled, reprinting an already-printed print job using the stored data, wherein reprinting includes reprinting an already-printed print job selected from the list of the plurality of already-printed print jobs represented on the displayed print job history screen;

selectively setting a delete function included in the image processing device to be enabled or disabled according to user operation on a job security setting screen to be displayed by the display, wherein the setting via the job security setting screen applies not only to a specific print job to be printed but also to a plurality of print jobs executed by the image processing apparatus;

deleting, after execution of a print job is completed, data used in executing the print job from the stored data by overwriting the data by other data, wherein the deleting deletes data in a case where the delete function is set to be enabled;

setting the reprinting function to be disabled in response to setting of the delete function to be enabled; and restricting acceptance of an instruction to reprint any one of the already-printed print jobs included in the displayed print job history screen in a case where the delete function is set to be enabled, wherein, in a case where the delete function is set to be disabled, a reprint button for accepting the instruction to reprint at least one of the already-printed print jobs is displayed on the print job history screen, and wherein, in a case where the delete function is set to be enabled, the reprint button is not displayed on the print job history screen.

5. A non-transitory computer readable storage medium that stores a program for causing a computer to perform a control method for an image processing device, the control method comprising:

displaying a print job history screen which represents a list of a plurality of already printed print jobs;

storing data used in execution of a print job;

selectively setting a reprint function included in the image processing device to be enabled or disabled according to user operation on a reprint setting screen to be displayed by the display, wherein the setting via the reprint setting screen applies not only to a specific print job to be performed but also to the list of the plurality of already-printed print jobs represented on the print job history screen displayed by the display;

in a case where the reprint function is set to be enabled, reprinting an already-printed print job using the stored data, wherein reprinting includes reprinting an already-printed print job selected from the list of the plurality of already-printed print jobs represented on the displayed print job history screen;

selectively setting a delete function included in the image processing device to be enabled or disabled according to user operation on a job security setting screen to be displayed by the display, wherein the setting via the job security setting screen applies not only to a specific print job to be printed but also to a plurality of print jobs executed by the image processing apparatus;

deleting, after execution of a print job is completed, data used in executing the print job by overwriting the data by other data, wherein the deleting deletes data in a case where the delete function is set to be enabled;

setting the reprinting function to be disabled in response to setting of the delete function to be enabled; and restricting acceptance of an instruction to reprint any one of the already-printed print jobs included in the displayed print job history screen in a case where the delete function is set to be enabled, wherein, in a case where the delete function is set to be disabled, a reprint button for accepting the instruction to reprint at least one of the already-printed print jobs is displayed on the print job history screen, and wherein, in a case where the delete function is set to be enabled, the reprint button is not displayed on the print job history screen.

6. The image processing device according to claim 1, wherein, in a case where a setting is changed so that the delete function is enabled, stored data of the already printed print job is deleted at the time of the change.

7. The control method according to claim 4, wherein, in a case where the reprinting function is enabled, data used in the already-printed print job is stored in a predetermined region of at least one memory.

8. The control method according to claim 4, wherein, in a case where the delete function is set to be enabled, a status display is produced to check whether to enable reprint of a job after the print job is performed.

9. The control method according to claim 4, wherein, in a case where a setting is changed so that the delete function is enabled, stored data of the already printed print job is deleted at the time of the change.

10. The non-transitory computer readable storage medium according to claim 5, wherein, in a case where the reprinting function is enabled, data used in the already-printed print job is stored in a predetermined region of at least one memory.

11. The non-transitory computer readable storage medium according to claim 5, wherein, in a case where the delete function is set to be enabled, a status display is produced to check whether to enable reprint of a job after the print job is performed.

12. The non-transitory computer readable storage medium according to claim 5, wherein, in a case where a setting is changed so that the delete function is enabled, stored data of the already printed print job is deleted at the time of the change.

* * * * *